(12) United States Patent
Oishi

(10) Patent No.: US 8,345,157 B2
(45) Date of Patent: Jan. 1, 2013

(54) IMAGE PROCESSING APPARATUS AND IMAGE PROCESSING METHOD THEREOF

(75) Inventor: Akihiro Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 839 days.

(21) Appl. No.: 12/239,268

(22) Filed: Sep. 26, 2008

(65) Prior Publication Data

US 2009/0086092 A1    Apr. 2, 2009

(30) Foreign Application Priority Data

Sep. 28, 2007   (JP) ................................. 2007-255367
Sep. 5, 2008    (JP) ................................. 2008-228931

(51) Int. Cl.
*H04N 11/04* (2006.01)
*H04N 11/20* (2006.01)

(52) U.S. Cl. ...................................................... 348/448

(58) Field of Classification Search ................... 348/441, 348/448–452, 458
See application file for complete search history.

(56) References Cited

U.S. PATENT DOCUMENTS

| | | | | |
|---|---|---|---|---|
| 4,665,437 A * | 5/1987 | Nicholson | ...................... | 348/449 |
| 5,144,427 A * | 9/1992 | Kitaura et al. | ........... | 375/240.16 |
| 5,428,397 A * | 6/1995 | Lee et al. | ...................... | 348/448 |
| 5,579,054 A * | 11/1996 | Sezan et al. | ................... | 348/452 |
| 7,098,958 B2 * | 8/2006 | Wredenhagen et al. | ...... | 348/452 |
| 7,116,372 B2 * | 10/2006 | Kondo et al. | ................. | 348/448 |
| 7,349,029 B1 * | 3/2008 | Chou | ............................. | 348/448 |
| 7,564,902 B2 * | 7/2009 | Sasai et al. | ............... | 375/240.26 |
| 7,724,304 B2 * | 5/2010 | Wredenhagen et al. | ...... | 348/452 |
| 7,944,508 B1 * | 5/2011 | Chou | ............................. | 348/624 |
| 2005/0168650 A1 * | 8/2005 | Walls et al. | ................... | 348/666 |
| 2006/0023794 A1 * | 2/2006 | Wan et al. | ................ | 375/240.29 |
| 2006/0262217 A1 * | 11/2006 | Thompson et al. | ........... | 348/441 |
| 2007/0002151 A1 * | 1/2007 | Ozaki | .......................... | 348/251 |
| 2007/0030383 A1 * | 2/2007 | Law et al. | ..................... | 348/448 |
| 2008/0024675 A1 * | 1/2008 | Sekiguchi et al. | ............ | 348/700 |
| 2010/0045862 A1 * | 2/2010 | Burns et al. | ................... | 348/452 |

FOREIGN PATENT DOCUMENTS

JP     2007-110217 A    4/2007

* cited by examiner

*Primary Examiner* — Jefferey Harold
*Assistant Examiner* — Humam Satti
(74) *Attorney, Agent, or Firm* — Canon U.S.A., Inc. IP Division

(57) ABSTRACT

An image processing apparatus detects an amount of pixel motion in a plurality of field images included in interlace image data, and determines a pixel region having a large motion by comparing the amount of the motion of the detected pixel to a predetermined threshold value. An image processing apparatus combines a predetermined pattern with the pixel region that has a large motion and is converted from the interlace image.

12 Claims, 6 Drawing Sheets

IMAGE PROCESSING APPARATUS AND IMAGE PROCESSING METHOD THEREOF

BACKGROUND OF THE INVENTION

1. Field of the Invention

The present invention relates to an image processing apparatus and an image processing method thereof, more particularly, a suitable technology that converts an interlace image into a progressive image.

2. Description of the Related Art

When an interlace image that is a moving image is printed or displayed on a display screen as a still image, the interlace image is converted into a progressive image to be printed or displayed as the still image.

It is known that when an interlace-progressive conversion is performed, a motion between field images in the interlace images is calculated, a position of a pixel is adjusted with reference to the motion, and paired field images are combined.

Japanese Patent Application Laid-Open No. 2007-110217 discusses a technology that generates a non-interlace signal by interpolating a line signal into a video signal acquired by interlace scanning and generates an interpolated pixel corresponding to an edge of an image.

However, according to the above technology, when viewing a generated progressive image, in many cases, a user cannot visually recognize that in the portions of a large motion between the field images, a high-frequency component of the image is missing. Further, there is a problem that it is impossible to change a display of the progressive image according to the motion between the field images. Further, it is impossible to clearly specify the portion in the image having the large motion so that a user can identify the portion.

SUMMARY OF THE INVENTION

The present invention is directed to a technology that enables a user to identify a missing portion of a high-frequency component due to a motion between field images in a progressive image converted from an interlace image.

Further, the present invention is directed to a technology that can clearly specify a portion having a large motion between field images to enable a user to generate a suitable progressive image having a small motion.

According to aspect of the present invention, an image processing apparatus that converts interlace image data into progressive image data includes a detecting unit configured to detect an amount of a pixel motion between a plurality of field images included in the interlace image data, a determination unit configured to determine a pixel region having the large motion by comparing the amount of each pixel motion detected by the detecting unit to a predetermined threshold value, a conversion unit configured to convert the interlace image data into the progressive image data, and an image processing unit configured to combine a predetermined pattern with the pixel region that is included in the progressive image converted by the conversion unit and determined by the determination unit to have the large motion.

According to another aspect of the present invention, an image processing apparatus that converts interlace image data into progressive image data includes a detecting unit configured to detect an amount of a pixel motion between a plurality of field images included in the interlace image data, a determination unit configured to determine a missing portion of a high-frequency component of an image due to a motion between the plurality of field images by comparing the amount of each pixel motion detected by the detecting unit to a predetermined threshold value, a conversion unit configured to convert the interlace image data into the progressive image data, and an image processing unit configured to combine a predetermined pattern with the a missing portion of the high-frequency component that is included in the progressive image converted by the conversion unit and determined by the determination unit.

According to yet another aspect of the present invention, an image processing method that converts an interlace image data into a progressive image data includes detecting an amount of a pixel motion between a plurality of field images included in the interlace image data, determining a pixel region having the large motion by comparing the detected amount of the each pixel motion to a predetermined threshold value, converting the interlace image data into the progressive image data, and combining a predetermined pattern with the pixel region having the large motion included in the converted progressive image.

According to yet another aspect of the present invention, an image processing method that converts an interlace image data into a progressive image data includes detecting an amount of a pixel motion between a plurality of field images included in the interlace image data, determining a missing portion of a high-frequency component of an image due to a motion between the plurality of field images by comparing the detected amount of the each pixel motion to a predetermined threshold value, converting the interlace image data into the progressive image data, and combining a predetermined pattern with the missing the high-frequency component included in the converted progressive image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
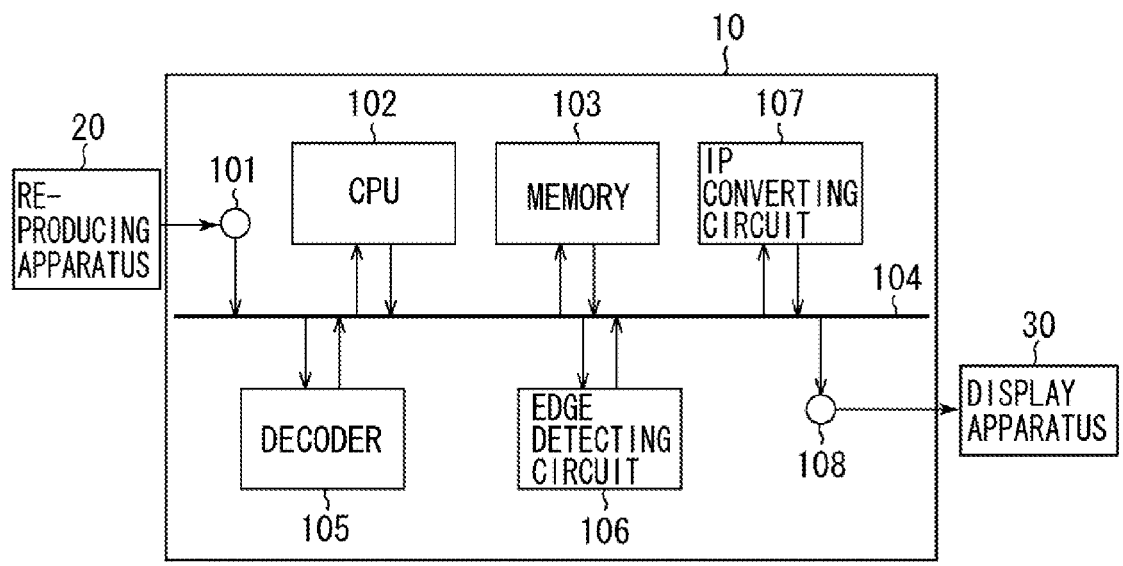
FIG. 1 is a block diagram illustrating an example of a configuration of an image processing apparatus according to an exemplary embodiment of the present invention.

FIG. 1 is a block diagram illustrating an example of a configuration of an image processing apparatus 10 according to an exemplary embodiment of the present invention.

In FIG. 1, a reproducing apparatus 20 is connected to an input terminal 101 in the image processing apparatus 10, and a display apparatus 30 is connected to an output terminal 108 in the image processing apparatus 10.

Image data obtained by interlace scanning is input from a reproducing apparatus 20 to an input terminal 101. The image processing apparatus 10 includes a control circuit (central processing unit (CPU)) 102, a memory 103, a data bus 104, a decoder 105, an edge detecting circuit 106, and an interlace-progressive converting circuit (IP converting circuit)) 107. The IP converting circuit 107 converts image data of the interlace scanning into image data of a progressive scanning data. The output terminal 108 outputs the image data converted into the progressive image.

The image processing apparatus 10 of the present exemplary embodiment configured as described above will be described.

Image data reproduced by the reproducing apparatus 20 is input from the input terminal 101. The input image data is compressed interlace image data that is compressed and encoded using a compress-encoding scheme by a Moving Picture Experts Group (MPEG). The input compressed-image data is input into the decoder 105 via the data bus 104.

The compressed image data input into decoder 105 is decoded into a decoded image by a predetermined decoding scheme. The decoded image is stored in the memory 103 via the data bus 104. The decoded image stored in the memory 103 is read out under control of the CPU 102 and supplied to each part. In this case, the CPU 102 functions as a data-reading unit.

When the interlace image data is output as it is, the image data read out from the memory 103 is supplied to the output terminal 108 via the data bus 104. The image data is output from the output terminal 108 to the display apparatus 30.

On the other hand, when the interlace image data is converted into a progressive image data, the image data read out from the memory 103 is supplied to the edge detecting circuit 106 and the IP converting circuit 107 via the data bus 104 in order of display on a screen.

The edge detecting circuit 106 detects an edge in each field image included in the interlace image that is the input decoded image. The edge is detected per pixel unit, or per pixel block. The CPU 102 acquires information (edge information) about a position and an amount of a motion of the edge detected by the edge detecting circuit 106 to control conversion from the interlace image into the progressive image based on the edge information.

The IP converting circuit 107 converts the interlace image into the progressive image. More specifically, the IP converting circuit 107 combines two successive field images in the input decoded images and sequentially generates progressive images.

Further, while converting the interlace image into the progressive image, under control of the CPU 102, the IP converting circuit 107 performs correcting processing and specific processing on a portion where motion of the edge occurs between the field images.

The correcting processing retouches the image to be combined so that the amount of the edge motion is cancelled. On the other hand, in the specific processing of the image, a portion in which the edge makes an extreme motion, that is, a portion having a large motion between the field images can be made visually distinguishable.

High-frequency components may be lost when the interlace image is converted into the progressive image. Accordingly, highlight processing is performed to clearly specify a portion in which high-frequency components are missing due to the motion between the field images. The conversion from the interlace image into the progressive image will be described more specifically below.

The decoded image converted into the progressive image in the IP converting circuit 107 is again stored in the memory 103 via the data bus 104. The decoded image is once again read out by the CPU 102 and supplied to the output terminal 108 via the data bus 104. Thus, the decoded image can be output to the display apparatus 30.

One example of the processing of the interlace-progressive conversion carried out in the CPU 102, the edge detecting circuit 106 and the IP converting circuit 107 will be described.

Figure 2:
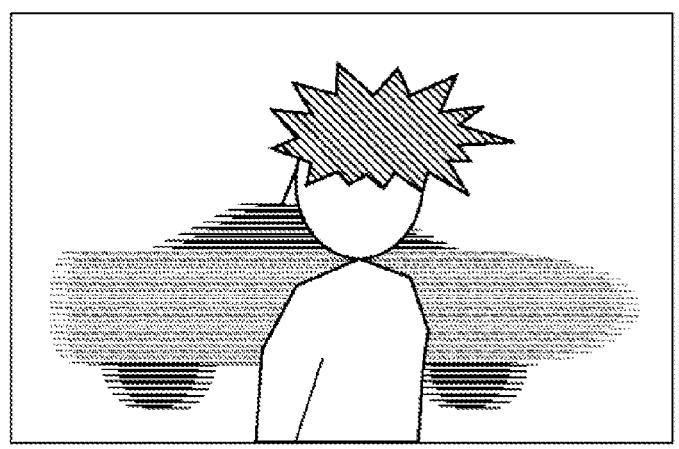
FIG. 2 is a diagram illustrating an example of an interlace image.

FIG. 2 is a diagram illustrating an example of an interlace image. The interlace image is supplied from the memory 103 to the IP converting circuit 107. Further, the same interlace image is supplied to the edge detecting circuit 106.

Figure 3A:
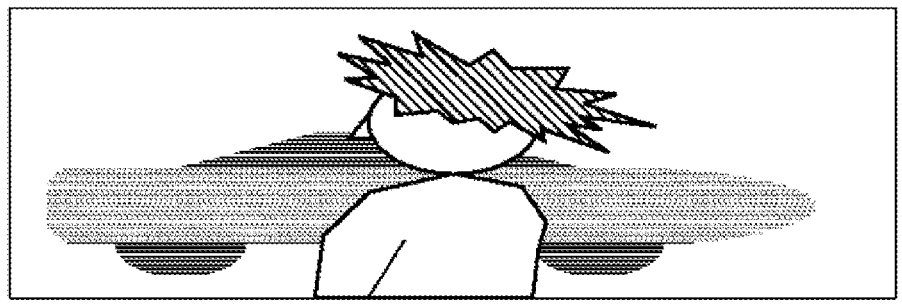
FIGS. 3A and 3B are diagrams each illustrating an example of a field image.
Figure 3B:
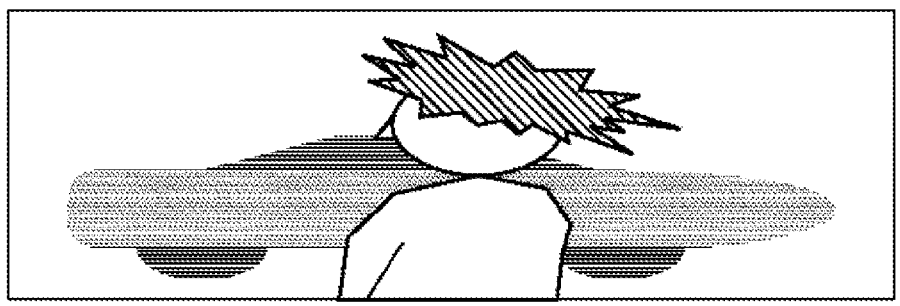
Figure 4A:
FIGS. 4A and 4B are diagrams each illustrating an example of an edge-detecting result of the field image.
Figure 4B:

FIGS. 3A and 3B are diagrams each illustrating an example of a field image. The edge detecting circuit 106 divides the input interlace image into images for each field as illustrated in FIGS. 3A and 3B, and performs edge detection on each field image. FIGS. 4A and 4B are diagrams each illustrating an example of an edge-detecting result in the field image.

The edge-detecting results performed by the edge detecting circuit 106 on the field images of FIGS. 3A and 3B are respectively illustrated in FIGS. 4A and 4B. Further, the edge detecting circuit 106 compares both edges in the field images of FIGS. 4A and 4B, and calculates the number of the pixel transfer whose edges have been detected.

Figure 5A:
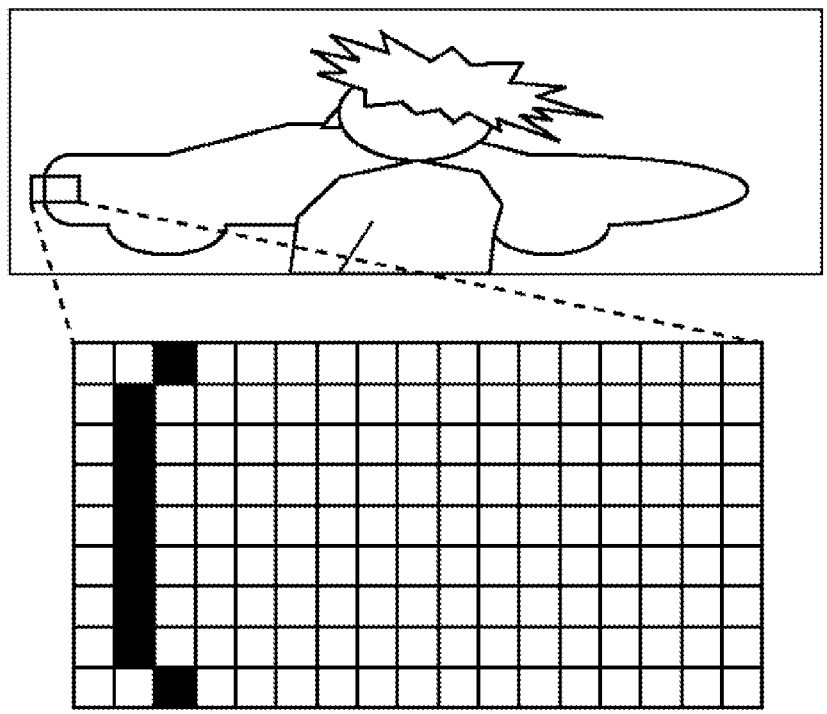
FIGS. 5A and 5B are diagrams each illustrating an enlarged portion of the edge-detecting result of the field image.
Figure 5B:
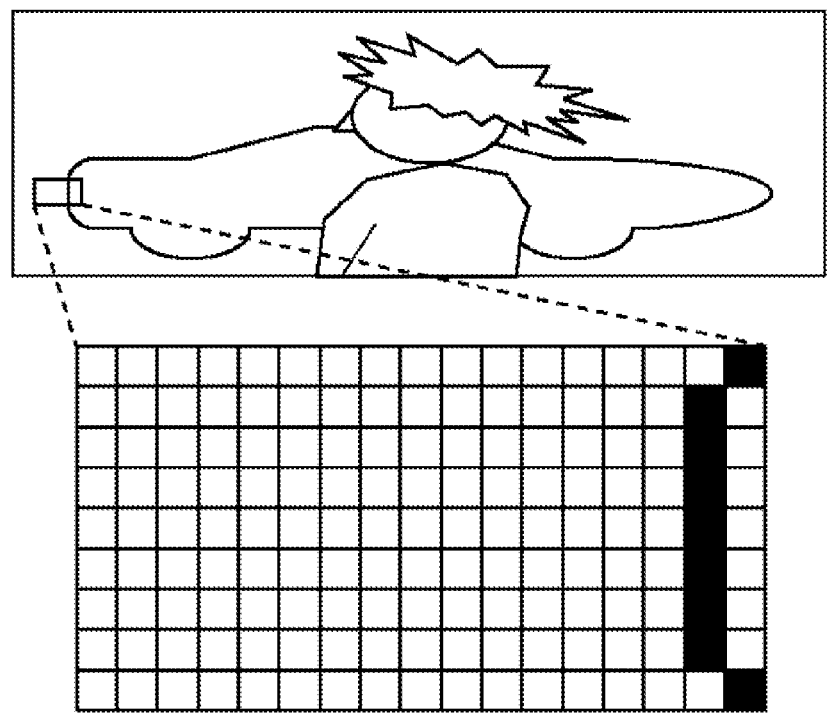

FIGS. 5A and 5B are diagrams each illustrating an enlarged portion of the edge-detecting result in the field image. The number of pixel transfer can be calculated by comparing the edges in the field images of FIGS. 4A and 4B at a level of pixels as illustrated in FIGS. 5A and 5B. It can be seen from the examples of FIGS. 5A and 5B that the edge has moved by 14 pixels in an X-axial direction (lateral direction on a screen).

The present exemplary embodiment illustrates a motion only in the X-axial direction as an example. However, the number of pixel transfer are calculated in both the X-axial direction and the Y-axial direction (vertical direction on the screen) when the amount of the motion between the field images in the interlace image is calculated.

A Canny filter and a Laplacian filter, for example, can be used for detecting the edge. Since a detecting level of the edge can be changed by changing a coefficient of the filter, it is possible by changing the coefficient to calculate the transfer of the pixel whose edge can be detected. Further, the transfer of the pixel whose the edge is not detected can be calculated from the number of surrounding pixel transfer.

Upon the detection of the edge motion between the fields by the edge detecting circuit 106, the CPU 102 performs control for correction according to the edge motion while the IP converting circuit 107 performs the interlace-progressive converting process. The IP converting circuit 107 sequentially generates a progressive image from successive two field images, while following an instruction for correction given by the CPU 102.

Now, the progressive image generated by the IP converting circuit 107 will be described.

Figure 6:
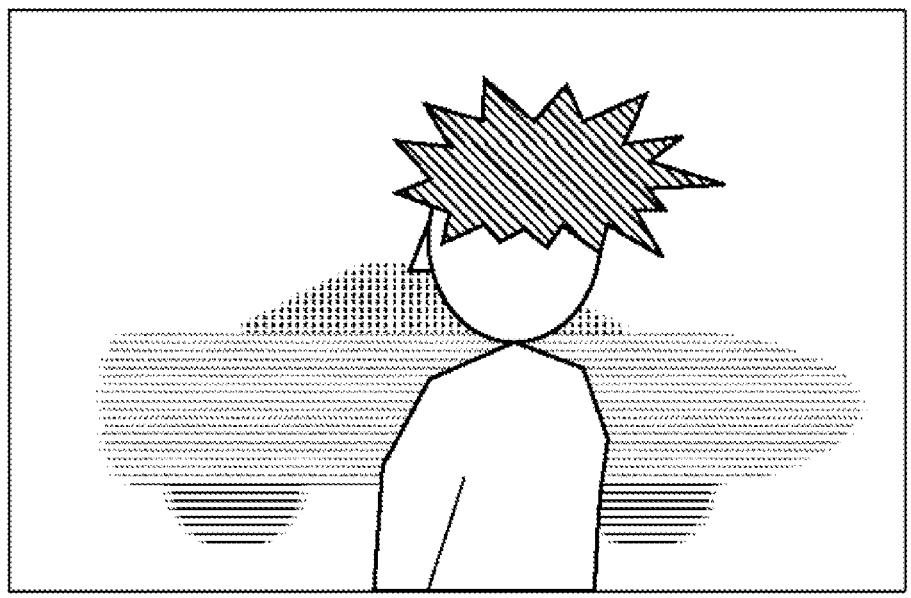
FIG. 6 is a diagram illustrating an example of a progressive image converted from an interlace image.

FIG. 6 is a diagram illustrating an example of a progressive image converted from an interlace image. As shown in the example of FIG. 6, the progressive image converted from the interlace image in which the motion is corrected has no slur between the fields unlike the image displaying the interlace image as it is as illustrated in FIG. 2.

However, the correcting processing may not be successfully performed on an image in a case where an object moves at a high speed, or the high-frequency component may be already missing when an image is photographed. Thus, a good image cannot be always obtained although the image is converted into the progressive image. That is, the progressive image may include the missing portion of the high-frequency component due to the motion between the field images.

Therefore, in the present exemplary embodiment, the IP converting circuit 107 performs the aforementioned specific processing, which will be described more specifically. The CPU 102 acquires the edge information about the amount of the motion of the edge pixel from the edge detecting circuit 106.

Based on the edge information, the CPU 102 determines the number of the pixel transfer of the edge when the two field images are converted into the progressive image. Based on a result of determination, the CPU 102 gives the IP converting circuit 107 an instruction for processing (highlight processing) the progressive image generated from the two field images described above.

The CPU 102 determines that the high-frequency component is missing from the edge pixel having the amount of the motion equal to or more than a threshold value. Thus, the CPU 102 causes the IP converting circuit 107 to perform the highlight processing on the progressive image to be generated so that the missing portion of the high-frequency component can be visually recognized.

As the highlight processing described above, for example, an image processing can be considered in which other image signal is superimposed on either a pixel region having the amount of the motion that is more than the predetermined threshold value, or a region having the amount of the motion that is less than the predetermined threshold value.

If the other image signal to be superimposed is, for example, a zebra pattern signal, the zebra pattern can be superimposed on a specified region. Alternatively, the specified region may change its hue, or the specified region may change its hue in combination with the zebra pattern. The predetermined pattern is not limited to the zebra pattern, but other design patterns can also be used.

Further, the luminance of the pixel having motion can be inverted, or the pixel having motion can be displayed so as to blink in a unit of frame or field. Further, it is possible to perform a highlight display such that the pixel having reduced high-frequency components becomes even vaguer, by replacing the pixel having the motion with an average value of the surrounding pixels.

Figure 7:
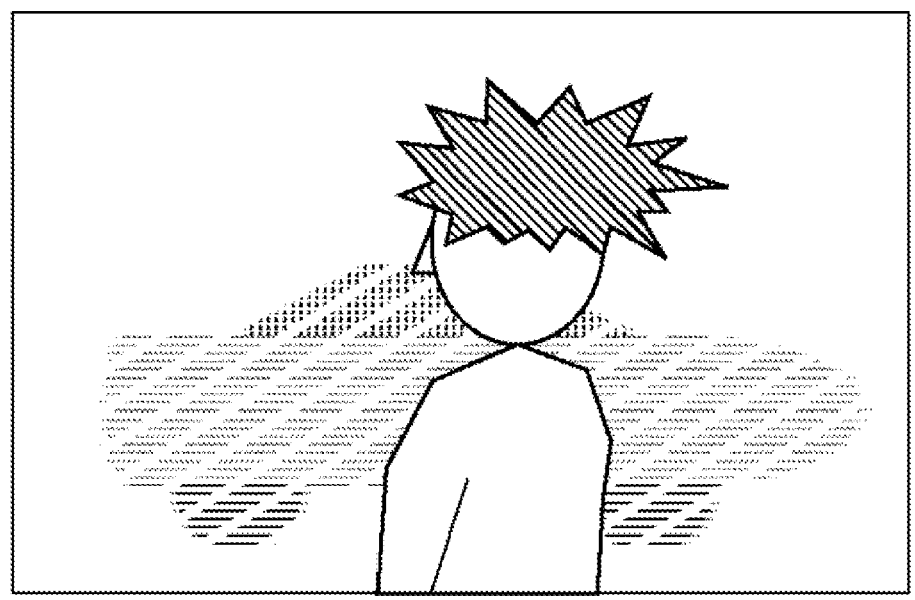
FIG. 7 is a diagram illustrating the progressive image in which a zebra pattern is combined with a portion having the large motion.

FIG. 7 is a diagram illustrating the progressive image in which a zebra pattern is combined with a portion having the large motion. According to the present exemplary embodiment, the display apparatus 30 can display a display image of the progressive image as illustrated in FIG. 7. The zebra pattern described in the present exemplary embodiment is an oblique stripe pattern within a range of brightness of first and second threshold levels.

The first level of the threshold value is a black-level value at which an image can be identified as an image, and the second threshold level is a white-level value at which the brightness of the image is not saturated. According to the present exemplary embodiment, the zebra pattern is combined with the specified region in the decoded image and the moving object in the decoded image is displayed with the overlapped stripe pattern as illustrated in FIG. 7.

In the present exemplary embodiment, the IP converting circuit 107 performs the highlight processing on the image. However, the progressive image converted from the interlace image may be stored in the memory 103, and then a predetermined pattern (e.g., zebra pattern) may be combined with the progressive image in the memory 103 under control of the CPU 102.

Alternatively, the progressive image to be generated may not be directly processed, but transformed so that the generated progressive image can be displayed with an overlaid predetermined pattern (e.g., zebra pattern) as another image layer.

Figure 8:
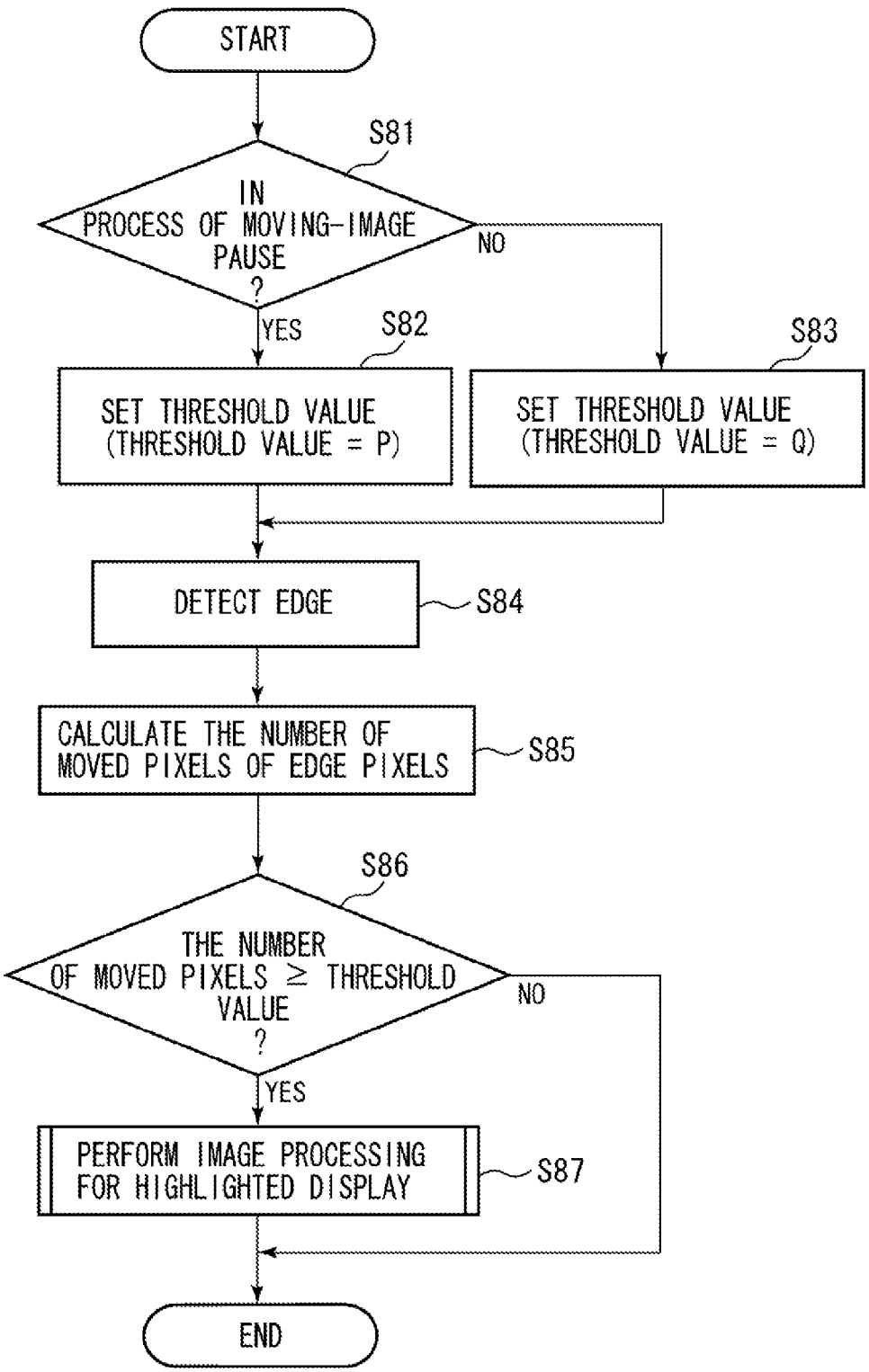
FIG. 8 is a flowchart illustrating a general processing procedure that detects a motion to highlight and display the portion having the large motion.

FIG. 8 is a flowchart illustrating a general procedure that highlights and displays the portion having the large motion upon a motion determination.

In FIG. 8, in step S81, the CPU 102 determines whether processing is a moving-image pause. The processing in step S81 determines whether the image data from the reproducing apparatus 20 is input during the moving-image reproduction or the moving-image pause.

In a case of the moving-image pause (YES in step S81), in step S82, the threshold value for determining the amount of the edge motion is set to "threshold value=P". If the image data is not input during the moving-image pause (NO in step S81), in step S83, the CPU 102 sets the threshold value for determining the amount of the edge motion to "threshold value=Q".

A still image is displayed as a reproduced image during the moving-image pause. In this case, the still image is displayed to observe and evaluate one screen in detail. On the other hand, during the moving-image reproduction, the image is displayed to roughly observe a plurality of screens.

Accordingly, the threshold value P is set to a lower value than the threshold value Q. The edge can be more easily detected when the threshold value is set to P. Parameters are previously stored in the CPU 102 and selectively used for the threshold values P and Q.

In step S84, the edge detecting circuit 106 detects the edge in each field image constituting the input interlace image.

Instep S85, the edge detecting circuit 106 calculates the number of the pixel transfer (edge pixel) in which the edge is detected. The number of the edge pixel transfer is calculated by comparing both edges in the field images as described above.

Figure 9:
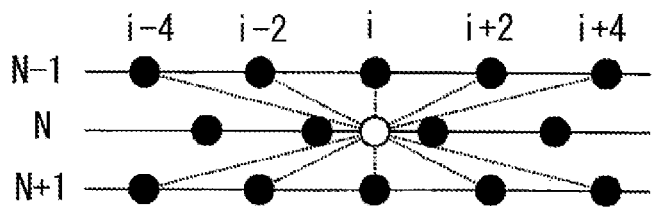
FIG. 9 is a diagram that illustrates a method of calculating a number of pixel motions of an edge pixel.

How to acquire the number of the edge pixel transfer will be described. FIG. 9 is a diagram that illustrates a method of acquiring the number of the edge pixel transfer. In FIG. 9, a lateral line represents a line within a field. With respect to the line, three fields of an N−1th field, an Nth field, and an N+1th field are illustrated.

Black dots represent the pixels disposed on the lines. Since the N−1th and the N+1th fields are the fields of even numbers, the pixels in the N−1th and the N+1th fields are disposed at vertically same positions. Since the Nth field is a field of an odd number, the pixels are disposed deviating by one pixel from the N−1th and the N+1th fields.

Taking the pixels on the line in the N−1th field as an example, the pixels are disposed at the positions of i−4, i−2, i, i+2, and i+4. That is, the position of the pixel can be expressed by i+2x (x is an integer) in each field, and the pixel is disposed deviating by one pixel from the pixel in every other field.

For example, when the number of the edge pixel transfer included in the Nth field is calculated, the edge detecting circuit 106 calculates the transfer amount of the pixel from the N−1 field, and further calculates the transfer amount of the pixel from the N+1 field. At this point, the edge detecting circuit 106 acquires an interpolated pixel p[N] [i] (white dot in FIG. 9). The pixel motions in a plurality of directions are acquired by p[N−1] [i−y] and p[N+1] [i+y] (y is an integer 0 or more) that are point symmetry about p[N] [i], from temporal correlation. It is expressed by the following expression (1).

$$|p[N-1] [i-y]-p[N+1] [i+y]| \qquad (1)$$

As a result of the above expression (1), a smallest value has the highest temporal correlation. The "y" for the smallest value is determined as the number of the pixel transfer. Thus, the number of the pixel transfer can be calculated for each pixel (edge pixel) within each field.

In step S86, the CPU 102 compares the number of the pixel transfer calculated in step S85 to the threshold values set in steps S82 or S83 and determines whether the amount of the motion of each pixel is larger than the predetermined amount of the motion (size of the motion).

According to a result of determination, if the number of the pixel transfer is equal to or more than the threshold value (YES in step S86), in step S87, the CPU 102 and the IP converting circuit 107 perform the image processing for the highlight display on the pixel region having the large motion and the flow ends.

On the other hand, according to the result of the determination in step S86, if the number of the pixel transfer is less than the threshold value (NO in step S86), the image processing for the highlight display is not performed on the pixel region and the flow ends.

Figure 10:
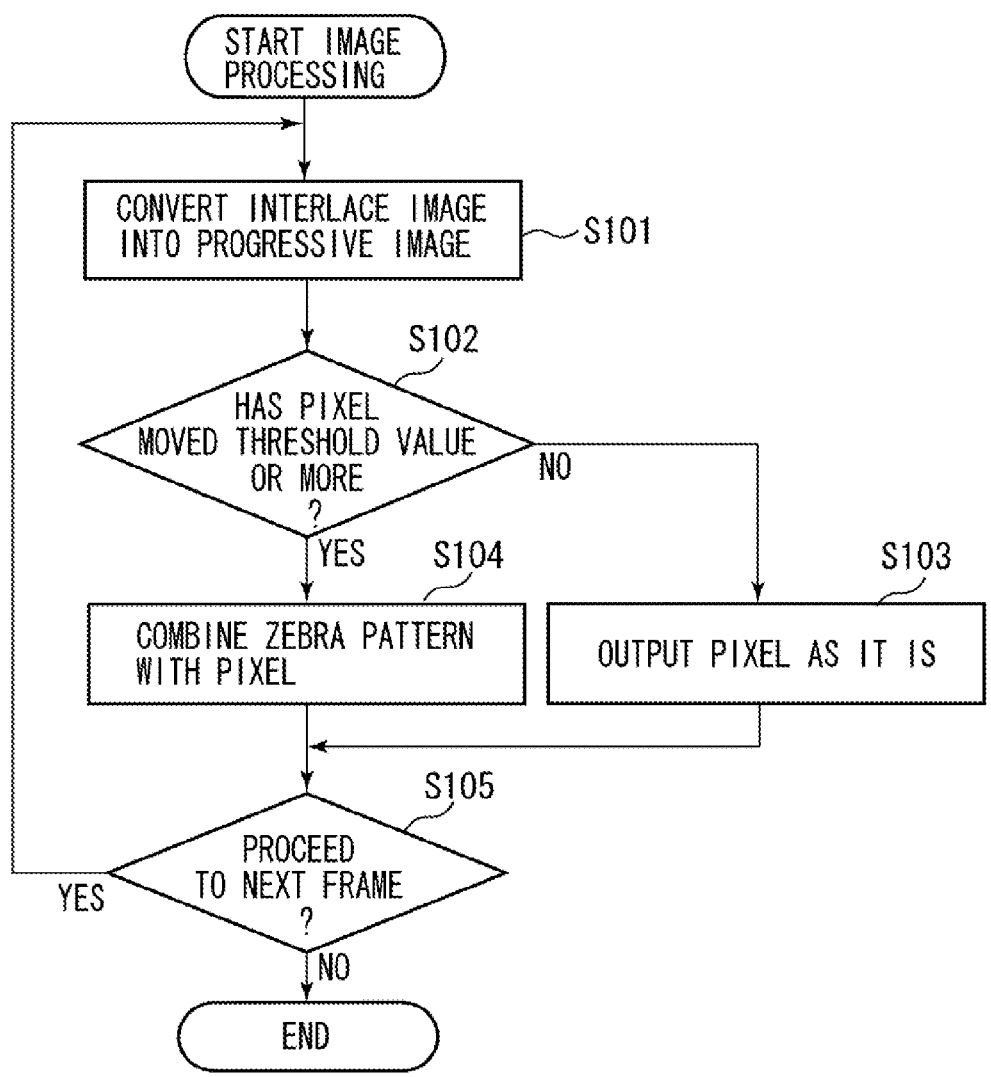
FIG. 10 is a flowchart illustrating a detailed processing procedure that highlights and displays the portion having the large motion.

The image processing for the highlight display performed in step S87 of FIG. 8 will be described in detail with reference to a flowchart illustrated in FIG. 10. FIG. 10 is a detailed flowchart illustrating a procedure that highlights and displays the portion having the large motion.

A major reason that the pixel moves is an effect of an out-of-focus image caused by the time during which an image sensor is subjected to light and an amount of a motion of an object. According to the present exemplary embodiment, when the interlace image is converted into the progressive image, a portion where the high-frequency component is reduced due to the motion of the object can be highlighted and displayed by combining the predetermined pattern with the pixel as illustrated in FIG. 10.

In FIG. 10, in step S101, the IP converting circuit 107 converts the successive two field images constituting the input interlace image into the progressive image.

Instep S102, the IP converting circuit 107 determines whether each of the pixels of the progressive image has moved by the threshold value or more according to the control information from the CPU 102.

When the pixel has not moved by the threshold value or more (NO in step S102), in step S103, the IP converting circuit 107 outputs the pixel as it is. That is, the highlight processing is not performed on the pixel having a small motion.

On the other hand, when the pixel has moved by the threshold value or more (YES in step S102), in step S104, the IP converting circuit 107 combines the zebra pattern with the pixels in the specified region according to the control information from the CPU 102. The specified region herein refers to a region of the pixels where the number of the pixel transfer is equal to or more than the threshold value.

When the converting processing on one progressive image and the image processing for highlight and display are completed, in step S105, the IP converting circuit 107 determines whether the processing proceeds to a next frame. If the moving image is in process of reproduction, the processing proceeds to the next frame (YES in step S105) and returns to step S101. The IP converting circuit 107 repeatedly performs the converting progressing and the image processing for highlight and display on subsequent interlace images.

On the other hand, during the moving-image pause, the processing does not proceed to the next frame (NO in step S105) and the flow is ended. Even in process of the moving-image reproduction, if the reproduction is stopped, the flow is forcibly ended.

According to the present exemplary embodiment, the region where the high-frequency component in the converted progressive image is missing can be clearly specified to a user, by displaying the progressive image combined with the zebra pattern on the display apparatus 30 in step S104.

Since the zebra pattern can be selectively combined or not combined with each pixel region of the progressive-converted image, only the portion having the large motion can be displayed with the zebra pattern, and the portion having the small motion can be displayed as it is.

By performing the processing as described above, the user can easily determine whether the image sufficiently includes the high-frequency component of the desired object, or the high-frequency component is missing in the image.

In the present exemplary embodiment, the CPU 102 controls display or non-display of the predetermined pattern (zebra pattern). The CPU 102 includes a function of changing the threshold value that determines the amount of the edge motion depending on the moving-image reproduction or the moving-image pause.

The CPU 102 further includes a function that changes the threshold value that determines the amount of the edge motion according to an operation mode of the reproducing apparatus 20 such as a moving-image reproducing mode, still-image reproducing mode, print-image selecting mode.

For example, in the moving-image reproducing mode, the CPU 102 sets a higher threshold value, and highlights and displays only the edge pixel having an extremely large motion. In the still-image reproducing mode or print image selecting mode, a lower threshold value is set so that the user can check the image in detail.

As a result, when the still image is displayed or the print image is selected, the user can select the progressive image that has the smallest motion and the highest-frequency components. The threshold value of the print-image selecting mode may be set further lower than the still-image reproducing mode.

As described above, according to the present exemplary embodiment, a user can easily recognize that in the progressive image converted from the interlace image, the high-frequency component is missing. Further, by clearly specifying the portion having the large motion between the field images, a good progressive image having the small motion can be generated or selected.

Each unit included in an image processing apparatus according to the exemplary embodiment of the present invention described above can be realized by an operation of a program stored in a random access memory (RAM) or a read only memory (ROM) in a computer. The present invention includes the program and a computer-readable storing medium for storing the program.

Further, an exemplary embodiment according to the present invention can be, for example, a system, apparatus, method, program, and storing medium. In other words, the present invention may be applied to a system including a plurality of devices and also an apparatus including a device.

According to the present invention, a software program (program corresponding to the flowcharts illustrated in FIGS. 8 and 10 in the present exemplary embodiment) is supplied directly or remotely to the system of the apparatus to execute each processing included in the image processing method described above. The present invention can be also realized when the system or the computer of the apparatus reads and executes the supplied program code.

Therefore, the program code to be installed in the computer also realizes the present invention so that the computer realizes the functional processing according to the exemplary embodiment of the present invention. That is, the present invention includes the computer program itself for realizing the functional processing according to the present invention.

In that case, an embodiment such as a program executed by an object code, or interpreter and a script data supplied to an operation system (OS) may be used, if the embodiment has a function of a program.

Various kinds of storing media can be used as a storing medium for supplying a program. The storing media include a floppy disk, hard disk, optical disk, optical-magnetic disk, magneto-optical disk (MO), compact disk read-only memory (CD-ROM), compact disk recordable (CD-R), compact disk rewritable (CD-RW), magnetic tape, nonvolatile memory card, read only memory (ROM), digital versatile disk (DVD (DVD-ROM, DVD-R)).

Other methods for supplying the program include connecting a website of the Internet using a browser of a client computer. A computer program or a compressed file including an automatically-installing function according to the exemplary embodiment of the present invention can be supplied by downloading from the website.

Further, the program code included in the program according to the exemplary embodiment of the present invention can be divided into a plurality of files, and each of the files can be downloaded from different websites so that the present invention is realized.

Further, the present invention can include a World Wide Web (WWW) server that enables a plurality of users to download the program file that realizes by the computer the functional processing according to the exemplary embodiment of the present invention.

The program according to the exemplary embodiment of the present invention may be encoded and stored in a computer readable storing medium such as CD-ROM and distributed to users. The user who satisfies a predetermined condition can download key information for decoding the encoded program from the website via the Internet. The present invention can be realized by executing the encoded program using the key information and installing the program in the computer.

Moreover, an execution of the read out program by the computer can realize the function of the exemplary embodiment as described above. The execution of a portion of an actual processing or all of the processing by the OS running on the computer can also realize the function of the exemplary embodiment described above.

The program read out from the computer readable storing medium is written into a function-extending unit connected to the computer or a memory provided in a function-extending board inserted into the computer. Based on an instruction by the program, the CPU or the like provided in the function-extending board or function-extending unit executes all or part of the actual processing so that the processing can realize the function of the exemplary embodiment described above.

While the invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2007-255367 filed Sep. 28, 2007 and 2008-228931 filed Sep. 5, 2008, which are hereby incorporated by reference herein in their entirety.

What is claimed is:

1. An image processing apparatus that converts interlace image data into progressive image data, the image processing apparatus comprising:

a detecting unit configured to detect an amount of a pixel motion between a plurality of field images included in the interlace image data;

a control unit which includes a processor, configured to determine a pixel region having pixels in which the amount of each pixel motion is larger than a predetermined amount, by comparing the amount of each pixel motion detected by the detecting unit to a predetermined threshold value;

a conversion unit configured to convert the interlace image data into the progressive image data; and a display output unit configured to output the progressive image data to a display apparatus, wherein, the conversion unit performs an image processing for a highlight display on the pixel region that is included in a progressive image converted by the conversion unit, and the display output unit outputs image data generated by the image processing for the highlight display together with the progressive image data to the display apparatus so as to recognizably display the pixel region by the display apparatus.

2. The image processing apparatus according to claim 1, wherein the detecting unit detects an amount of edge motion included in each of the plurality of field images.

3. The image processing apparatus according to claim 1, wherein the control unit changes the predetermined threshold value depending on whether the interlace image data is in the process of moving-image reproduction or in a moving-image pause.

4. The image processing apparatus according to claim 1, further comprising a reproducing unit configured to reproduce the interlace image data, wherein the control unit changes the predetermined threshold value depending on whether the reproducing unit is in a moving-image reproducing mode or in a still-image reproducing mode.

5. The image processing apparatus according to claim 1, wherein the conversion unit combines a zebra pattern as the highlight display with the pixel region by superimposing.

6. An image processing apparatus that converts interlace image data into progressive image data, the image processing apparatus comprising:

a detecting unit configured to detect an amount of a pixel motion between a plurality of field images included in the interlace image data;

a control unit which includes a processor, configured to determine a missing portion of a high-frequency component of an image due to a motion between the plurality of field images by comparing the amount of each pixel motion detected by the detecting unit to a predetermined threshold value;

a conversion unit configured to convert the interlace image data into the progressive image data; and a display output unit configured to output the progressive image data to a display apparatus, wherein, the conversion unit performs an image processing for a highlight display on the missing portion of the high-frequency component that is included in a progressive image converted by the conversion unit, and the display output unit output image data generated by the image processing for the highlight display together with the progressive image data to the display apparatus so as to recognizably display the missing portion of the high-frequency component by the display apparatus.

7. The image processing apparatus according to claim 6, wherein the detecting unit detects an amount of edge motion included in each of the plurality of field images.

8. The image processing apparatus according to claim 6, wherein the control unit changes the predetermined threshold value depending on whether the interlace image data is in the process of moving-image reproduction or in a moving-image pause.

9. The image processing apparatus according to claim 6, further comprising a reproducing unit configured to reproduce the interlace image data, wherein the control unit changes the predetermined threshold value depending on whether the reproducing unit is in a moving-image reproducing mode or in a still-image reproducing mode.

10. The image processing apparatus according to claim 6, wherein the conversion unit combines a zebra pattern as the highlight display with the missing portion of the high-frequency component by superimposing.

11. An image processing method that converts interlace image data into progressive image data, the image processing method comprising:

detecting an amount of a pixel motion between a plurality of field images included in the interlace image data;

determining a pixel region having pixels in which the amount of each pixel motion is larger than a predetermined amount, by comparing the detected amount of the each pixel motion to a predetermined threshold value;

converting the interlace image data into the progressive image data;

outputting the progressive image data to a display apparatus; and performing an image processing for a highlight display on the pixel region included in a converted progressive image; and outputting image data generated by the image processing for the highlight display together with the progressive image data to the display apparatus so as to recognizably display the pixel region by the display apparatus.

12. An image processing method that converts an interlace image data into a progressive image data, the image processing method comprising:

detecting an amount of a pixel motion between a plurality of field images included in the interlace image data;

determining a missing portion of a high-frequency component of an image due to a motion between the plurality of field images by comparing the detected amount of the each pixel motion to a predetermined threshold value;

converting the interlace image data into the progressive image data;

outputting the progressive image data to a display apparatus;

performing an image processing for a highlight display on the missing portion of the high-frequency component included in a converted progressive image; and outputting image data generated by the image processing for the highlight display together with the progressive image data to the display apparatus.

* * * * *